Oct. 21, 1952 M. CAMRAS 2,614,761
SPOOL AND DRIVE THEREFOR
Filed Feb. 18, 1946 2 SHEETS—SHEET 1
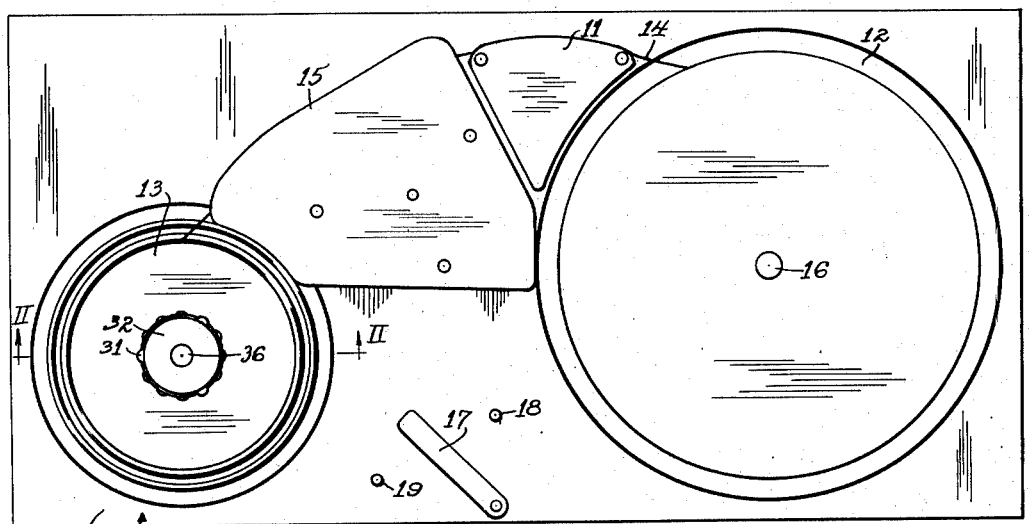
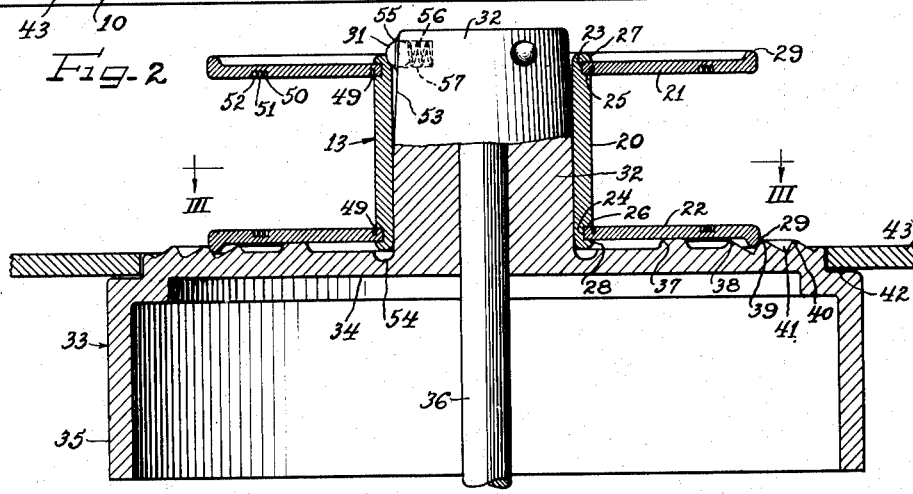
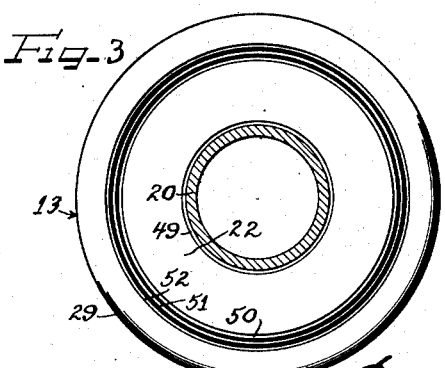
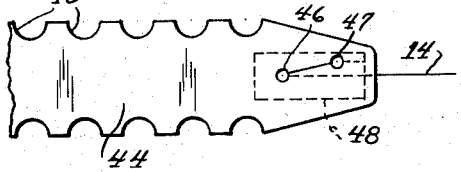
Inventor
Marvin Camras

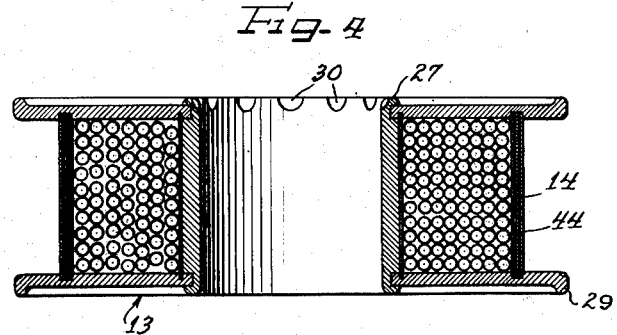
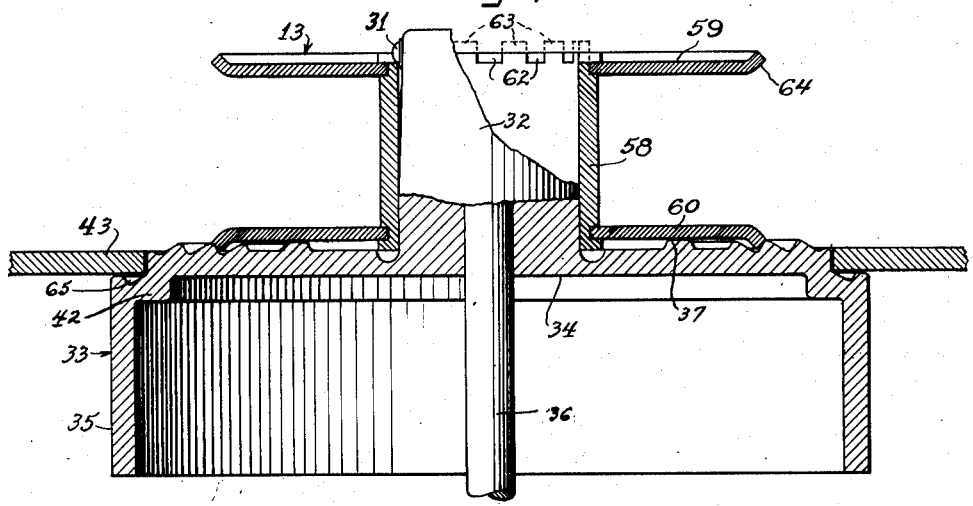
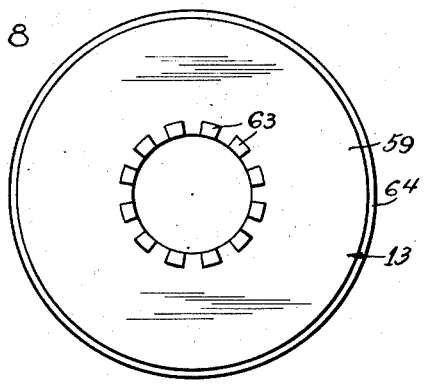
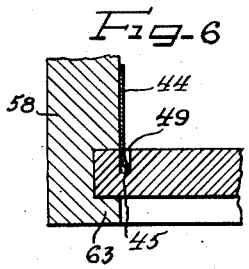

Patented Oct. 21, 1952

2,614,761

UNITED STATES PATENT OFFICE 2,614,761

SPOOL AND DRIVE THEREFOR

Marvin Camras, Chicago, Ill., assignor to Armour Research Foundation of Illinois Institute of Technology, Chicago, Ill., a corporation of Illinois Application February 18, 1946, Serial No. 648,424

8 Claims. (Cl. 242—54)

This invention relates to a spool and drive therefor, and more particularly to a spool which is particularly suited for handling extremely fine wire or the like, such, for example, as the four mil wire which is commonly used in magnetic recording and reproducing devices.

One of the principal features and objects of the present invention is to provide a small compact spool which is economical to manufacture, which may readily be inserted into driving engagement on a drive shaft, and which mechanism includes means for confining the wire or other threadlike medium in a small area if a portion thereof becomes disengaged from the spool while it is rotating.

A further object of the present invention is to provide a winding and reeling spool of novel construction.

A still further object of the present invention is to provide a spool having novel means thereon for securing the inner and outer ends of a relatively fine wire or the like wound thereon.

Another object of the present invention is to provide a novel mounting and driving mechanism for a spool carrying an elongated element which is to be unwound from the spool or wound thereon.

Another and still further object of the present invention is to provide a novel driving connection between a spool and a drive shaft.

Still another and further object of the present invention is to provide novel means for catching any wire or the like which unwinds from the spool while the spool is rotating, thereby preventing the wire which comes off the spool from getting tangled or snarled in other portions of the equipment or exterior of the equipment.

The novel features which I believe to be characteristic of my invention are set forth with particularity in the appended claims. My invention itself, however, both as to its organization, manner of construction and method of operation, together with further objects and advantages thereof, may best be understood by reference to the following description taken in connection with the accompanying drawings, in which:

Figure 1 is a plan view of a magnetic recording and reproducing unit which has been provided with a spool and drive therefor embodying the novel teachings of the present invention;

Figure 2 is a vertical sectional view of the spool and drive therefor as employed in Figure 1 and as taken along the line II—II of Figure 1;

Figure 3 is a horizontal sectional view of the spool with the driving mechanism removed as taken along the line III—III of Figure 2;

Figure 4 is a vertical sectional view through the spool with the wire and its securing means in place;

Figure 5 is a fragmentary view of a portion of the leader as it is secured to the end of the wire;

Figure 6 is fragmentary sectional view of a portion of one of the side walls of the spool showing the manner in which the edge of the leader fits into one of the grooves provided in the side wall;

Figure 7 is a view similar to Figure 2 showing a modified form of the present inventon; and Figure 8 is a top view of the spool with the driving mechanism removed.

Referring first to Figure 1 of the drawings, there is illustrated therein the top of a magnetic recording and reproducing unit 10. This recording and reproducing unit 10 includes a magnetic recording and reproducing head 11, a large take-up spool 12 and a relatively smaller spool 13 upon which the wire 14 is usually stored when not being used on the recording and reproducing device 10. This wire 14 passes through guide and other mechanism 15 (which forms no part of the present invention) and then passes through the head 11, where it is wound up on the take-up spool 12. The wire is later returned to the spool 13 by reversing the direction of rotation of the shafts 35 and 16 which are associated respectively with the spools 13 and 12. An operating switch or handle 17 is provided, which, when moved to a position against the stop pin 19 causes rotation of the take-up spool 12 in a clockwise direction, and which, when moved into position against the stop pin 18, causes rotation of the storage spool 13 in a counter-clockwise direction.

As previously indicated, the storage spool 13 and the drive therefor embody the novel teachings and principles of the present invention. These teachings and principles are best exemplified in Figures 2 to 6 of the drawings, in so far as one preferred embodiment of the invention is concerned. More particularly, the spool 13 is made from a cylindrical tube 20 and a pair of disk shaped end plates 21 and 22. In forming the spool the two ends of the tube 20 are cut in to provide end portions of reduced diameter, as indicated at 23 and 24. The end plates 21 and 22 are provided with circular center openings of the same diameter as the reduced end portions 23 and 24 of the tube 20. The plates 21 and 22 are then slipped over these end portions against the shoulders 25 and 26. The end plates are held in place by thereafter rolling over the edges of the tube 20 as at 27 and 28. This securely fastens the end plates 21 and 22 in place.

In order to strengthen the end plates 21 and 22 near their radial outer portions, the peripheral edge is extruded (preferably before mounting on the tube 20) to form an enlarged bead 29.

As may be seen best in Figure 4, the rolled over end 27 is provided with a series of recesses 30 which are circumferentially spaced around the ends of the tube 20. As may be seen best in Figure 2, these recesses 30 are arranged to receive the spring pressed balls 31 which are carried on the hub 32 of the drive shaft.

The hub 32 is formed as an integral part of a drum 33 which includes a radially outwardly extending body part 34, an axially extending outer flange 35, in addition to the hub 32. This drum 33 is mounted on and directly secured to the drive shaft 36, and forms a unitary part thereof.

The body part 34 of the drum 33 includes a series of annular ridges 37, 38, 39 and 40. The annular ridge or rib 37 is arranged to seat and support the spool 13. The annular ribs 38, 39 and 40, which are substantially saw-toothed in radial cross-section, are arranged to receive spools of different predetermined diameters, there being one rib for each diameter. As is exemplified in Figure 2, the annular rib 39 is designed for a spool of the diameter shown in the drawing. The rib or ridge 39 is located a distance slightly radially outwardly of the outer extremity of the spool 13 so that in effect the beaded portion 29 extends down behind or inside of the annular ridge 39. If for any reason the spool 13 is unwinding faster than the wire is being taken up on the take-up spool 12, any wire which slips over the outer edge of the spool 13 will drop into the gutter 41 which lies between the ridge 39 and the ridge 40. Since the body part 34 of the drum 33 is rotating with the spool 13 and at the same speed, the wire which comes off the spool 13 will merely be collected and rotated with the drum 33.

As is shown in Figure 2, the drum 33 is further provided with a shoulder 42 which lies under the panel or stationary wall portion 43 of the magnetic recording and reproducing device 10. This is a further safeguard which tends to prevent the wire from becoming snarled or caught inside of the machine.

The manner in which the wire is retained on the spool 13 may be seen best in Figures 4, 5 and 6 of the drawings. Each end of the wire 14 is provided with a leader 44 which may be conveniently formed of some suitable plastic material, such as one of the polystyrenes, and is provided along each of its longitudinal edges with a plurality of tongues or ears 45. These tongues or ears are conveniently formed by merely removing semi-circular portions of material at intervals along the edge of the leader. This particular leader is described and claimed in detail in my copending application for patent entitled "Leader for magnetic recorder medium and method of making the same," U. S. Serial No. 638,497, filed December 29, 1945, and assigned to the same assignee as the present invention. Merely by way of summary, the wire 14 is inserted through a hole 46 in the leader 44 and then back through a second hole 47. A securing strip 48 having a pressure-sensitive adhesive thereon is secured over the surface of the leader 44 where the wire is drawn through the holes 46 and 47. One of these leaders 44 is provided at each end of the wire, the one at the outer end of the wire being preferably somewhat longer than the one at the inner end so that it may make one complete wrap about the drum of the take-up spool 12. The leader 44 at the inner end may make one or more wraps around the drum 20 of the spool 13, but as illustrated in the drawing, is arranged to make only a single wrap.

The overall width of the leader 44 is slightly greater than the spacing between the end plates 21 and 22 to enable the tongues 45 to make a resilient friction engagement with the walls 21 and 22. In order that the leader may lie flat so that even the initial layer of wire will be flat on the spool, annular recesses 49, 50, 51 and 52 are provided in each end wall. When the leader 44 is first wrapped around the drum 20, the ears or tongues 45 will snap into the grooves 49 and substantially the entire body portion of the leader will lie flat on the drum 20. The extreme tips of the tongues 45 will be slightly flexed due to the fact that even the bases of the grooves are spaced apart a lesser distance than the overall width of the leader 44.

The manner in which one of these tongues lies in the groove 49 is shown in Figure 6 of the drawings. The grooves 50, 51 and 52 have been shown in a concentric group and of course, with such an arrangement only some of the tongues 45 will lie in the grooves. The other tongues will lie against the wall portions between the grooves. If desired, a spiral groove may be provided on the inner faces of the drum end walls so that all of the tongues 45 will lie within the spiral groove.

In order that the spool 13 may be quickly and easily slipped over the hub 32, the hub 32 is slightly tapered, as at 53, over at least a portion of its length. As shown in the drawing, it is tapered back for a distance approximately half of its length.

An annular recess 54 is provided in the body portion 34 adjacent the lower end of the hub 32 opposite the rolled over edge 28. This is provided so that the spool will not seat at this point.

The balls 31 are retained in the upper portion of the hub 32 by a peened over edge 55 or the like which makes the opening slightly less than the diameter of the balls. The balls are spring-pressed by small coil springs 56 which are mounted in wells 57 which extend radially into the hub 32. The balls 31 are located in such a manner that when the spool 13 is slipped over the hub the balls 31 will be depressed until the spool is seated on the annular rib 37. When the spool has reached this position the balls will be forced out by their associated springs 56 into the ball detents or recesses 30 of the spool. If the balls do not drop immediately into the recesses 30 it will be observed that a very slight turning movement of the spool (either by hand or by initial relative movement between the spool and the hub) will cause the balls to drop into the detents 30. By providing a relatively large number of detents 30 as compared with the balls 31, it will be seen that only a very slight angular movement between the spool and the hub 32 is necessary in any instance to permit the balls to be positioned in the detents 30.

In Figures 7 and 8 of the drawings I have illustrated a modified form of the present invention. In order to facilitate comparison of this modified form of the invention with that just described, similar parts will be given similar reference numerals. The spool 13, in this instance, is formed of a drum 58 and a pair of end plates or walls 59 and 60. The drum 58 is reduced in diameter at each of its ends as at 61. In this form of the invention, however, each of the ends is notched back as at 62 to provide a plurality of tongues 63 (see the dotted line in Figure 7 for an indication of the tongues in their original cut position). These tongues are thereafter folded radially outwardly after the end plates 59 and 60 have been slipped into place to clamp these plates into place (see the full line position of the tongues in Figure 7 and also Figure 8).

The notches 62 between the tongues 63 are of such width as to provide the necessary detents or ball recesses for engagement with the spring-pressed balls 31.

In this form of the invention the outer edges of the spool end walls are spun or flared outwardly as at 64. The grooves 49, 50, 51 and 52 shown in the first form of the invention have been eliminated here to indicate the fact that these grooves may be omitted if desired, for economical or other reasons; or the faces of the end walls may be sandblasted, have marks coined in or be dished inwardly to retain the leader.

As shown in Figure 7, the offset flange portion 42 may also be provided with a groove 65, as additional wire catching means.

While I have shown certain particular embodiments of my invention it will, of course, be understood that I do not wish to be limited thereto, since many modifications may be made and I, therefore, contemplate, by the appended claims, to cover all such modifications as fall within the true spirit and scope of my invention.

I claim as my invention:

1. A winding and reeling mechanism comprising a vertically disposed drive shaft, a radially outwardly extending flange member secured to said shaft, said flange member including an axially extending hub, a spool having a hollow core member and a pair of end walls and mounted on said flange member, said hub extending into said core member, means for restraining relative movement between said hub and core, said flange member extending out radially farther than the adjacent end wall of said spool, and means on said flange member for seating one of said end walls, whereby any elongated member which is wound on said spool and which slips over the end wall of said spool is carried by said flange member with the same rotational movement as said spool.

2. A winding and reeling mechanism comprising a vertically disposed drive shaft, a radially outwardly extending flange member secured to said shaft, said flange member including an axially extending hub portion, a spool having a hollow core member and a pair of end walls and mounted on said flange member, said hub extending into said core member, means for restraining relative movement between said hub and core, said flange member extending out radially farther than the adjacent end wall of said spool and having an abutment thereon for seating one of said end walls, whereby whenever any portion of an elongated member wound on said spool drops over the outer edge of the bottom end wall said elongated member is caught and carried by said radially outwardly extending flange member.

3. A winding and reeling mechanism comprising a vertically disposed drive shaft, a radially outwardly extending flange member secured to said shaft, said flange member including an axially extending hub portion, a spool having a hollow core member and a pair of end walls and mounted on said flange member, said hub extending into said core member, means for restraining relative movement between said hub and core, said flange member extending out radially farther than the adjacent end wall of said spool and having an annular abutment thereon for seating one of said end walls, said radially outwardly extending flange member also having a circular groove therein radially outwardly of the outer peripheral edge of the bottom end wall of said spool, whereby whenever any portion of an elongated member wound on said spool drops over the outer edge of the bottom end wall said elongated member is caught and carried by said radially outwardly extending flange member.

4. A winding and reeling mechanism comprising a vertically disposed drive shaft, a radially outwardly extending flange member secured to said shaft, the outer peripheral edge of said radially extending flange member being offset downwardly to define an annular shoulder, a stationary panel member having an opening therein into which said flange member extends, said offset portion of said flange member being disposed beneath said panel member, and the main body portion of said flange member being substantially in the same plane as said panel member, said flange member including an axially extending hub, a spool having a hollow core member and a pair of end walls, said hub extending into said core member, means for restraining relative movement between said hub and core, said main body portion of said flange member extending out radially farther than the adjacent end walls of said spool, said radially outwardly extending flange member having a circular groove therein radially outwardly of the outer peripheral edge of the bottom end wall of said spool.

5. A winding and reeling mechanism comprising a vertically disposed drive shaft, a radially outwardly extending flange member secured to said shaft, the outer peripheral edge of said radially extending flange member being offset downwardly, a stationary panel member having an opening therein into which said flange member extends, said offset portion of said flange member being disposed beneath said panel member, and the main body portion of said flange member being substantially in the same plane as said panel member, said flange member including an axially extending hub, a spool having a hollow core member and a pair of end walls, said hub extending into said core member, means for restraining relative movement between said hub and core, said main body portion of said flange member extending out radially farther than the adjacent end walls of said spool, said radially outwardly extending flange member having a circular groove therein radially outwardly of the outer peripheral edge of the bottom end wall of said spool, said offset portion of said flange member also having a groove therein, whereby said grooves tend to catch any portion of an elongated member wound on said spool which tends to drop over the outer edge of the spool.

6. A winding and reeling mechanism comprising a drive shaft, a radially outwardly extending flange member secured to said shaft, said flange member including an axially extending hub, said flange member having a plurality of concentric annular ribs on the outer face thereof, a spool having a hollow core member, said hub extending into said core member and said spool being supported on said flange member by at least one of said annular ribs.

7. A winding and reeling mechanism comprising a drive shaft, a radially outwardly extending flange member secured to said shaft, said flange member including an axially extending hub, said flange member having a plurality of concentric annular ribs on the outer face thereof, a spool having a hollow core member, said hub extending into said core member and said spool being supported on said flange member by at least one of said annular ribs, and at least two additional ribs being disposed radially outwardly of the outer peripheral edge of said spool whereby any portion of an elongated medium wound on said spool which spills over is caught between said last two mentioned ribs.

8. A winding and reeling mechanism comprising a drive shaft, a radially outwardly extending flange member secured to said shaft, said flange member including an axially extending hub, said flange member having a plurality of concentric annular ribs on the outer face thereof, a spool having a hollow core member, said hub extending into said core member and said spool being supported on said flange member by at least one of said annular ribs, and at least two additional ribs being disposed radially outwardly of the outer peripheral edge of said spool whereby any portion of an elongated medium wound on said spool which spills over is caught between said last two mentioned ribs, the inner of said two mentioned ribs being disposed in close proximity to the outer peripheral edge of said spool.

MARVIN CAMRAS.

REFERENCES CITED

The following references are of record in the file of this patent:

UNITED STATES PATENTS

| Number | Name | Date |
|---|---|---|
| 390,752 | Cashin | Oct. 9, 1888 |
| 609,476 | Stickney | Aug. 23, 1898 |
| 1,503,896 | Harris | Aug. 5, 1924 |
| 1,598,845 | Blount et al. | Sept. 7, 1926 |
| 1,732,057 | Magill | Oct. 15, 1929 |
| 1,788,789 | Sharer et al. | Jan. 13, 1931 |
| 1,800,922 | Yancey | Apr. 14, 1931 |
| 2,164,426 | Renfroe | July 4, 1939 |
| 2,252,439 | Ray | Aug. 12, 1941 |
| 2,298,329 | Aldinger | Oct. 13, 1942 |
| 2,317,171 | Berby | Apr. 20, 1943 |
| 2,400,024 | Roehrl | May 7, 1946 |
| 2,462,261 | Goldberg | Feb. 22, 1949 |

FOREIGN PATENTS

| Number | Country | Date |
|---|---|---|
| 70,843 | Austria | Jan. 10, 1916 |
| 233,712 | Great Britain | Oct. 8, 1925 |
| 543,649 | Germany | Feb. 8, 1932 |
| 649,232 | France | Aug. 27, 1928 |
| 729,831 | France | May 3, 1932 |